Figure 1:
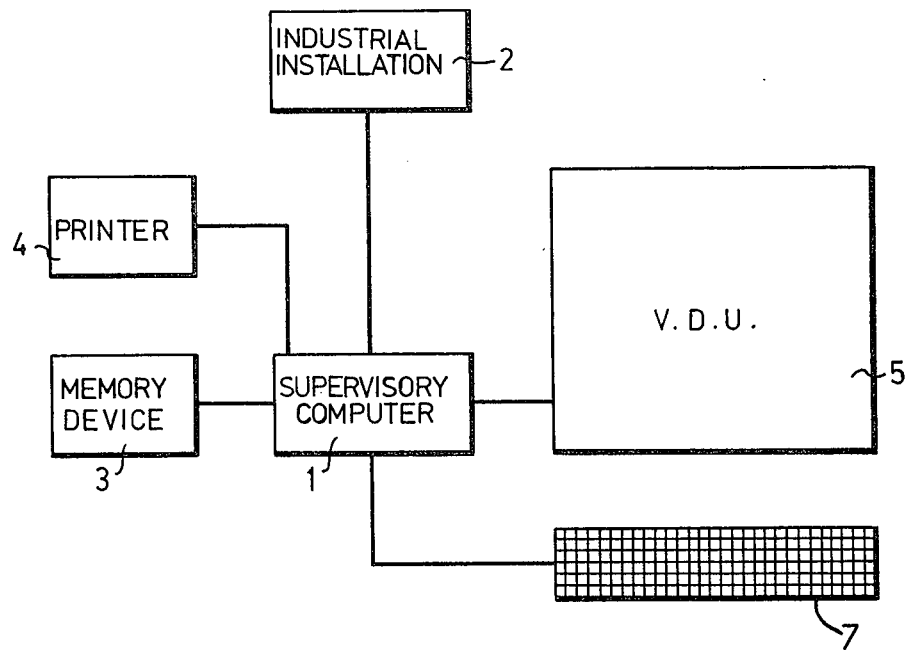

United States Patent [19]

Barratt et al.

[11] Patent Number: 4,459,695
[45] Date of Patent: Jul. 10, 1984

[54] FAULT FINDING IN AN INDUSTRIAL INSTALLATION BY MEANS OF A COMPUTER

[75] Inventors: David J. Barratt, Rotherham; John P. Russell, Sheffield, both of England

[73] Assignee: Davy McGee (Sheffield) Limited, Sheffield, England

[21] Appl. No.: 356,390

[22] Filed: Mar. 9, 1982

Related U.S. Application Data

[63] Continuation-in-part of Ser. No. 112,603, Jan. 16, 1980, abandoned.

[30] Foreign Application Priority Data

Nov. 7, 1979 [GB] United Kingdom ............... 7938544

[51] Int. Cl.$^3$ .................... G01R 31/28; G06F 11/32
[52] U.S. Cl. .................................. 371/25; 324/73 R; 371/20; 371/29
[58] Field of Search ................. 371/25, 20, 29; 324/73 R, 73 AT; 364/579, 580

[56] References Cited

U.S. PATENT DOCUMENTS

| | | | |
|---|---|---|---|
| 3,575,589 | 4/1971 | Neema et al. | 371/29 |
| 3,603,948 | 9/1971 | Medlinski | 371/29 |
| 3,961,250 | 6/1976 | Snethen | 371/25 |
| 4,000,460 | 12/1976 | Kadakia et al. | 371/29 |
| 4,055,801 | 10/1977 | Pike et al. | 371/25 |
| 4,063,311 | 12/1977 | Jeremiah et al. | 371/29 |
| 4,135,662 | 1/1979 | Dlugos | 371/29 |
| 4,218,745 | 8/1980 | Perkins | 324/73 AT |

FOREIGN PATENT DOCUMENTS 1328978 9/1973 United Kingdom .
1362314 8/1974 United Kingdom .
1477241 6/1977 United Kingdom .

OTHER PUBLICATIONS

G. Emilio et al., New Automatic Test Equipment Emphasizes User Interface, Autotestcon, Nov. 1977, pp. 191-198.

Primary Examiner—Charles E. Atkinson

[57] ABSTRACT

In a complex industrial installation, it is usually very difficult to locate the position of a fault when one occurs.

In a method of determining the location of a fault, information corresponding to each component part of the installation and the correct operating parameters of each component part is stored in a memory and a computer is used to produce on a visual display unit schematic diagrams of at least part of the installation and indicates tests which are to be carried out, the operator causes the test results to be supplied to the computer and, after comparing the results with the stored information, the computer indicates on the display either where the fault lies or further schematic diagrams and tests which are to be carried out to locate where the fault lies. Apparatus for carrying out the fault location is also described.

6 Claims, 3 Drawing Figures

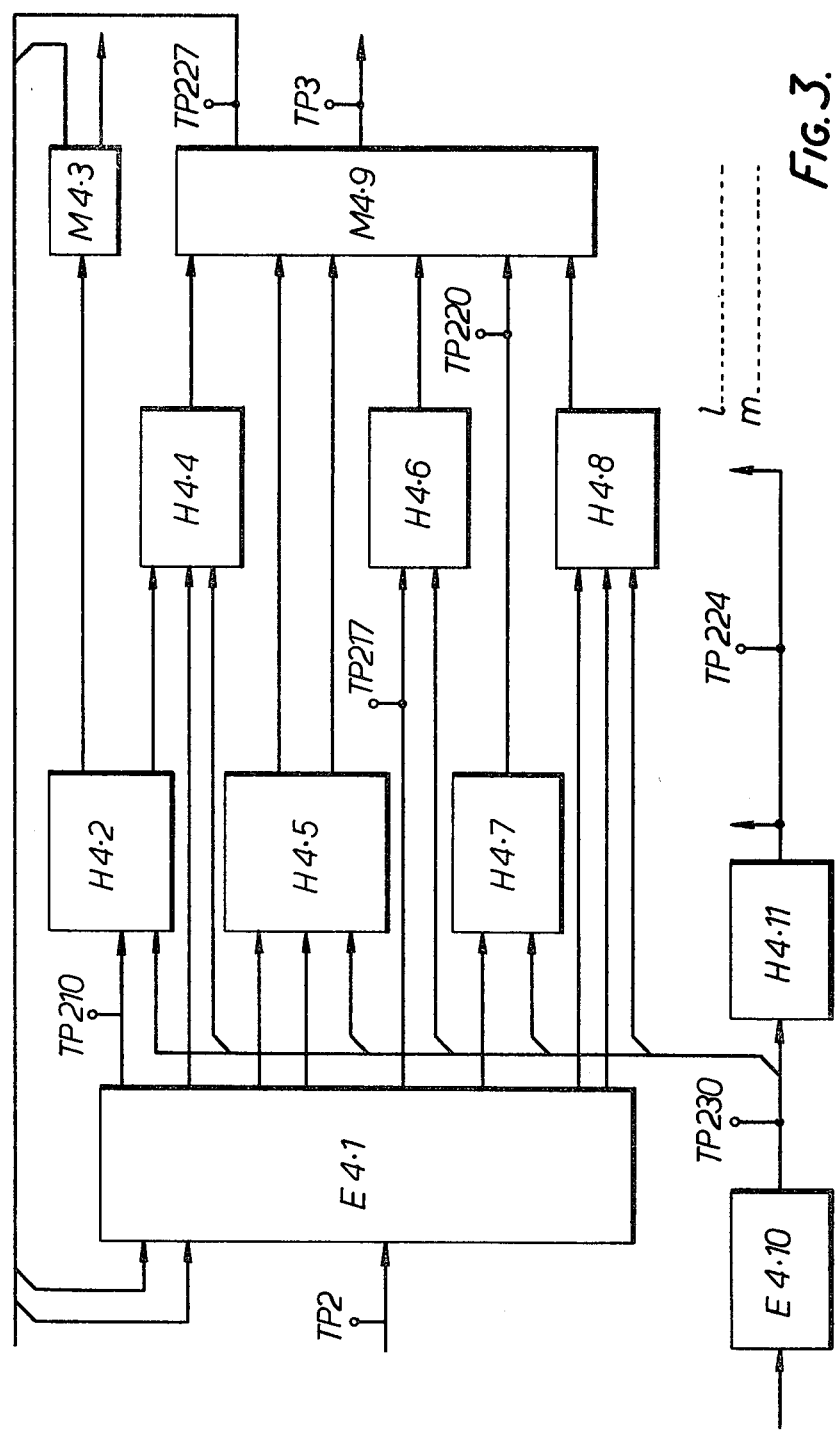

FAULT FINDING IN AN INDUSTRIAL INSTALLATION BY MEANS OF A COMPUTER

This application is a continuation-in-part of the U.S. patent application Ser. No. 112,603, filed Jan. 16, 1980, and now abandoned.

This invention relates to a method of, and apparatus for, determining the location of an indicated fault in an industrial installation. In many complex industrial installations, such as chemical plant and metal forming and shaping plant, the complexity and multiplicity of the equipment making up the installation is such that the location of a fault in the installation by maintenance personnel is extremely time consuming. If the fault causes the installation to be shut down, the cost of the loss of production during fault finding and repair or replacement of the faulty equipment can be extremely high. Furthermore, the complexity of the equipment in modern industrial installations is often such that locating a fault quickly and efficiently may be beyond the skill and technical experience of the maintenance personnel.

A fault diagnostic system has been proposed in which the entire industrial installation is illustrated in a fault finding manual in the form of an interconnected set of functions and sub-functions, presented in the form of block diagrams. Each block diagram shown in the manual will indicate all the inputs and outputs for each function block and will refer to test points by which each input or output may be tested. Also contained in the manual will be the method of testing with the test results which should be present under normal conditions. By performing checks as instructed, the maintenance personnel are taken step-by-step through the block functions diagrams until the part of the installation containing the fault is reached and which part is replaceable or within the ability of the maintenance personnel to repair.

A fault finding manual, as described above, for a large installation, can be of very large physical size which is not easily portable and indeed some of the information which should be contained in the manual, for example drawings of components parts, may by necessity have to be stored at a location away from the manual where it can only be obtained by the personnel on specific request.

The physical size of the manual and the fact that it may not contain all the information that is required are some of the disadvantages of this fault diagnostic system.

It is an object of the present invention, to provide a method of fault finding in an industrial installation by employing a computer which at least partially overcomes the disadvantages referred to above.

According to the present invention, in a method of determining the location of a fault in an industrial installation, prior to the fault occurring in the installation, information corresponding to each component part of the installation, including a block diagram thereof, and the correct operating parameters of each component part are stored in a memory device; subsequent to the fault occurring in the installation, the operator causes a computer to produce on a visual display unit a block diagram of at least part of the installation and to indicate tests which are to be carried out; the operator obtains results of said indicated tests and introduces the results into the computer; the computer compares said results with the corresponding stored information and, as a result of the comparison, indicates on the display device either the component in which the fault lies or further block diagrams and indicated tests which are to be carried out systematically to locate the component in which the fault lies.

The information stored in the memory device is conveniently in such a form that the visual display unit initially displays a block diagram of the installation with tests which are to be undertaken. Dependent upon the results of the test, the computer is able to determine in which part of the installation the fault lies and a display of a block diagram of this part is then displayed on the display unit. Further tests which are to be undertaken are also indicated on the display unit. When the results of these tests are supplied to the computer, the computer may be able to indicate in which component of equipment the fault lies or it may be necessary to display schematic diagrams of one or more components of the installation and tests which are required in order to eventually determine in which component the fault lies.

The invention enables an operator to systematically work through the equipment of a complex industrial installation until an indicated fault is found. The operator supplies the information to the various tests which are indicated on the visual display unit until the computer is able to determine in which component the fault lies. The component can then be repaired or replaced.

Figure 2:
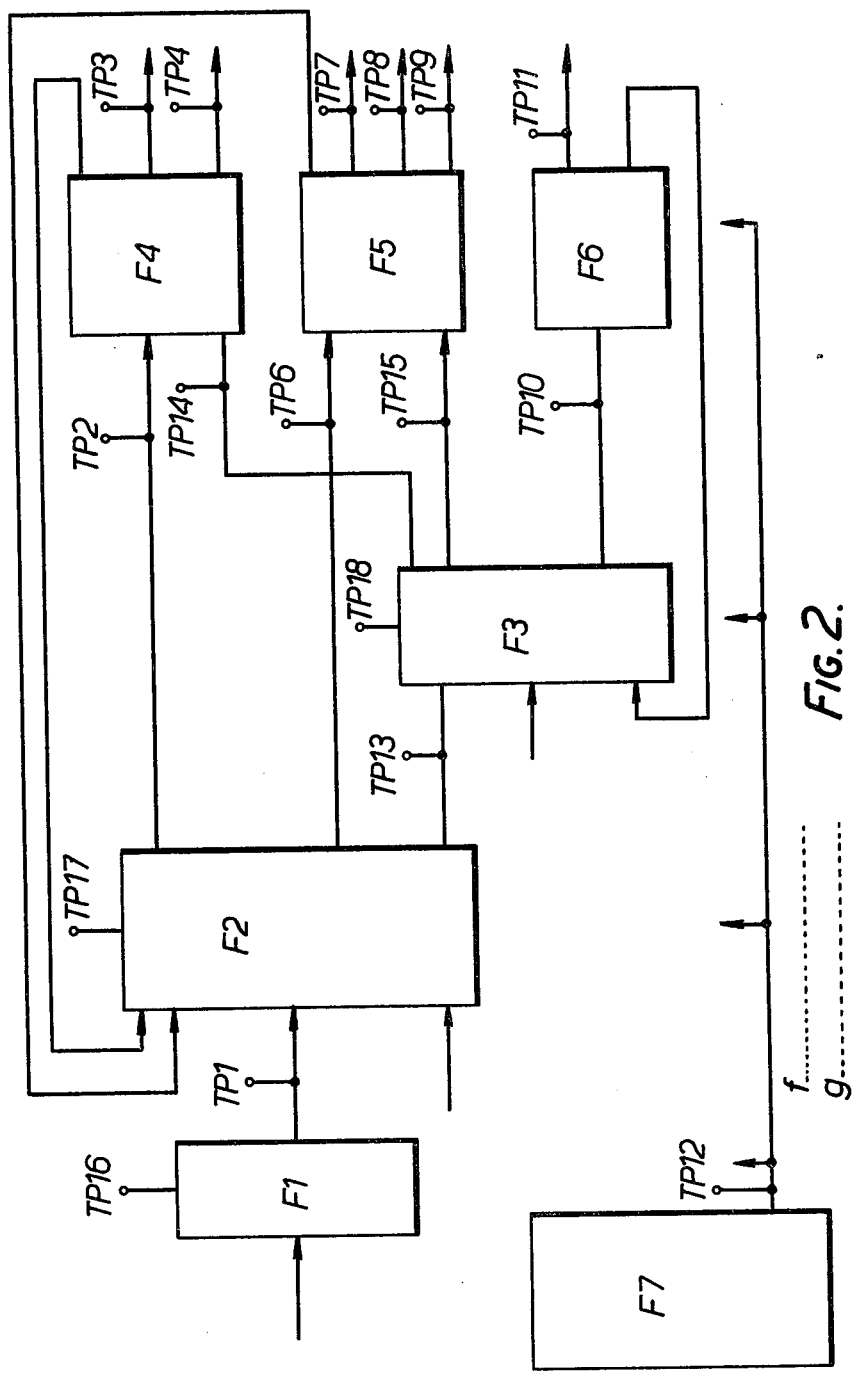

In order that the invention may be more readily understood, it will now be described, by way of example only, with reference to the accompanying drawings, in which:

FIG. 1 shows diagrammatically the apparatus for fault finding in an industrial installation, FIG. 2 is a typical display on a visual display device, and FIG. 3 is a display on a visual display device following the display of FIG. 2.

Referring to FIG. 1, a supervisory computer 1, for use with an industrial installation 2, has access to a memory device 3 and is connected to a printer 4, a visual display device VDU 5 and to an input keyboard 7. The keyboard and the VDU may be located on the control desk for the installation.

The supervisory computer 1 may be a DEC type PDP 11/23 and the memory device 3 may have 30M byte capacity made up of 2×10M byte memories and 2×5M byte memories. The visual display device 5 is conveniently an INTECOLOR type VDU sold by Intelligent Systems Corpn. (ISC). The interface of the colour monitor to the PDP 11/23 computer is by the International standard EIARS-232C.

The computer language may be the known DEC language MACRO 11.

Information in the form of block diagrams of the entire installation and of each component part of the installation are introduced into the memory by way of a standardized DEC software package known as "Picture Editor". The block diagrams can be called up at will on the INTECOLOR VDU with say the electrical connections shown in one colour and hydraulic connections in a different colour.

Information concerning the operating parameters of the components and "prompts" in the form of questions or instructions to the user are introduced into the memory and are programmed to be displayed on the VDU at the appropriate time.

A particular, but not sole, application of the invention is to the location of a fault in an integrated forging installation comprising a forging press and one or more ingot manipulators. Additional equipment such as a tool guide, an anvil slide and an ingot car may be included.

When a fault somewhere in the installation 2 is indicated, as for example by a visual or audible alarm, an operator causes a block diagram of either the entire installation or of a particular part thereof to be indicated on the visual display unit depending upon whether or not it is clear in which part of the installation the fault lies. A simplified block display of the entire installation is shown in FIG. 2. This display indicates interconnected equipment F1-F7. References TP1-TP20 indicate test points on the equipment where various test measurements or visual checks are to be made. References f and g indicate questions indicated on the display which have to be answered by the operator. The operator obtains the test information required for TP1-TP20 and introduces them into the computer by way of keyboard 7, unless the test information is obtainable by the computer from monitored points. The questions f and g are answered by the operator and the information supplied to the computer. The computer compares the information stored in the memory device 3 with the information supplied by way of test results TP1-TP20 and considers the answers to the questions f and g and determines in which equipment the fault lies. Say that the computer determines that the fault lies in equipment F4, the block diagram of equipment F4 is then displayed on the display unit as shown in FIG. 3. Equipment F4 has individual components 4.1 to 4.11 and references TP indicate positions where test information is required and l and m indicate questions which are to be answered. The letter E, H or M before the component number indicates that the component is mainly electrical, hydraulic or mechanical respectively.

The operator supplies the test results from positions TP and supplies the answers to questions l and m. This information is supplied to the computer. From a comparison of this information, and that previously stored, the computer is able to determine in which component the fault lies. The block diagram of this component is then indicated on the display unit. If this component is a replaceable module, a message on the VDU will indicate this fact to the operator who can then arrange for the replacement to be made, otherwise the above-described process is repeated until the fault is localised to a replaceable module.

Referring again to FIG. 2, this block diagram represents the function of the entire installation and as such shows all inputs and outputs to the installation. In the example referred to above, F1 is the forge supervision function, F2 is the system control function, F3 is the sequence control function, F4 is the manipulator control function, F5 is the press control function, F6 is the ingot car control function controlled by F3, and F7 is all the power supplies supplying power to F1 to F6. Some of the test points, e.g. TP1, TP2, TP6 and TP13, are checks on the data transferring along data links, whereas other test points, e.g. TP3 and TP4, are checks on the performance of the machinery of the installation. Some of these checks can be made visually, for example is a motor rotating or a ram operating, whereas the data transfer checks are made by the computer itself.

In FIG. 3 is shown the block diagram of function F4—the manipulator control function. The function shown in this figure indicates whether the function is mainly electrical, hydraulic or mechanical. For example, E4.1 indicates a largely electrical function and M4.9 indicates a largely mechanical function. This means that the operator can seek help from a maintenance man who specialises in the appropriate skill if the fault is indicated to be in one of these functions.

Each function indicates whether or not it is the lowest level to which it can be broken down in the fault finding procedure. For example, function 4.2 shown in FIG. 3 represents the long travel control of the manipulator. This in turn can be shown to have functions 4.2.1 to 4.2.8 and some of these functions can be represented by further functions, e.g. function 4.2.8 can be divided into components 4.2.8.1 to 4.2.8.8. When each component block is displayed on the VDU, it is indicated whether or not this component is a lowest level component, i.e. one which is a replaceable module. If it is a replaceable module, the VDU displays the manufacturers or installation part number so that a replacement can readily be obtained from stock for fitting into the installation.

The following is a simplified example of how the computer is programmed to systematically check the components of the installation in order to determine where a fault lies in the installation.

Suppose that the installation referred to above has been operating satisfactorily and suddenly the ingot manipulator fails to move along the track on which it is mounted. This fault would soon become apparent to the operator and he would want to find and correct the fault with minimum delay.

The first step is, by way of keyboard 7, to instruct the computer to display the block diagram of the entire installation, i.e. FIG. 2, on the VDU. The question f on the VDU would indicate that test point TP1 is to be checked first and would be of the form "What is the reading at TP1?". On making this check and introducing the result into the memory via the keyboard, the operator compares the introduced information with information already stored in the memory and, if the comparison indicates that all is satisfactory, question g then instructs the operator to check on TP2.

If the result of this check indicates that an instruction signal is correctly being supplied to the manipulator control function F4, then the VDU will inform the operator that the fault lies in the manipulator control function F4 and instructs him to examine the block diagram of function F4.

The operator keys in the appropriate instruction and the previously prepared block diagram of F4 appears on the VDU (See FIG. 3).

The question or command l instructs test point TP2 to be rechecked and, if this indicates that an instruction signal is correctly being supplied to the manipulator, then the VDU will instruct the operator to check TP210.

If the information keyed into the computer is correct, as compared with the previously stored information, then the VDU will display the information that the fault lies in function H4.2 since it is this function which should bring about movement of the ingot manipulator.

The next instruction is to select the block diagram of H4.2 and this shows, for example, functions 4.2.1 to 4.2.8.

The operator is instructed to check in turn each of the test points shown on the block diagram H4.2 and to supply the test information to the computer. Eventually the computer will receive some test information which is not correct, when compared with the previously stored information, and the operator is informed in which function, say 4.2.1, the fault lies.

The method of this invention enables an industrial installation to be kept operating as long as possible by ensuring that faults which cause the installation to be shut down are located as quickly as possible. In many cases a fault can be located without having to shut the installation down, and the down time is only represented by the time required to remove and replace the faulty component. By systematically checking the installation as indicated by the computer when a fault does occur, the fault can be located as quickly as possible. Furthermore, when a fault has been located, it can be corrected by maintenance personnel of the appropriate skill since the computer will indicate in which component the fault lies and the appropriate maintenance engineer can be called upon.

I claim:

1. A method of determining the location of a fault in an industrial installation in which prior to the fault occurring in the installation, information corresponding to each component part of the installation, including a block diagram thereof, and the correct operating parameters of each component part are stored in a memory device;

subsequent to the fault occurring in the installation, the operator causes a computer to produce on a visual display unit a block diagram of at least part of the installation and to indicate tests which are to be carried out;

the operator conducts the indicated tests on said part of the installation without removing said part of the installation from the industrial installation, the operator obtains results of said indicated tests and introduces the results into the computer;

the computer compares said results with the corresponding stored information and, as a result of the comparison, indicates on the display device either the component in which the fault lies or further block diagrams and indicated tests which are to be carried out systematically to locate the component in which the fault lies.

2. A method as claimed in claim 1, in which the schematic diagrams indicate test points on the installation where checks are to be made and the information supplied to the computer.

3. A method as claimed in claim 2, in which at least some of the checks are made at points continuously monitored by the computer.

4. A method as claimed in claim 2, in which at least some of the checks are made by the operator and information is introduced by the operator into the computer.

5. A method as claimed in claim 1, in which the schematic diagrams of various components indicate whether the components are of mainly electrical, mechanical or hydraulic form.

6. A method as claimed in claim 5, in which electrical, mechanical and hydraulic components are indicated on the schematic diagrams in different colours.

* * * * *